United States Patent
Shih

(10) Patent No.: US 6,634,611 B1
(45) Date of Patent: Oct. 21, 2003

(54) SUSPENSION HANGER FRAMEWORK

(76) Inventor: Sung-Feng Shih, No. 5, Hoping Lane, Manshin Tsun, Show Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 10/298,090

(22) Filed: Nov. 18, 2002

(51) Int. Cl.⁷ ................................................. B42F 13/00
(52) U.S. Cl. ................. 248/339; 248/291.1; 248/299.1; 248/322; 248/340
(58) Field of Search ................................. 248/322, 339, 248/340, 341, 188.1, 299.1, 291.1, 308, 222.52, 222.51, 188.6; 384/906; 74/526, 527; 403/83, 84, 93, 112

(56) References Cited

U.S. PATENT DOCUMENTS

| | | | | |
|---|---|---|---|---|
| 2,492,701 A | * | 12/1949 | Kirk | 211/100 |
| 2,555,181 A | * | 5/1951 | Brandt | 248/215 |
| 2,734,708 A | * | 2/1956 | Cohn | 248/517 |
| 4,051,953 A | * | 10/1977 | Shoaf | 211/119.1 |
| 4,394,047 A | * | 7/1983 | Brunelle | 297/362.12 |
| 4,471,867 A | * | 9/1984 | Forshee | 198/687 |
| 4,899,610 A | * | 2/1990 | Bourret | 74/489 |
| 5,169,221 A | * | 12/1992 | Wheeler | 312/323 |
| 5,479,993 A | * | 1/1996 | Bojar | 172/372 |
| 5,603,682 A | * | 2/1997 | Grider | 482/142 |
| D421,221 S | * | 2/2000 | O'Kane | D9/434 |
| 6,132,128 A | * | 10/2000 | Burrows | 403/96 |
| 6,206,387 B1 | * | 3/2001 | Tsai | 280/87.041 |
| 6,213,821 B1 | * | 4/2001 | Bernloehr et al. | 440/6 |
| 6,267,343 B1 | * | 7/2001 | Waisbrod et al. | 248/339 |
| 6,332,621 B1 | * | 12/2001 | Wu | 280/87.041 |

* cited by examiner

Primary Examiner—Leslie A. Braun
Assistant Examiner—Amy J. Sterling
(74) Attorney, Agent, or Firm—Harrison & Egbert

(57) ABSTRACT

A suspension hanger framework includes a fixation piece, a suspension rod, and a crossbar. The fixation piece is fixed with the ceiling or projection of a structure and is provided with two pivoting lugs, each being provided with a first slide slot and a second slide slot. The suspension rod is fastened pivotally at a top end to the two pivoting lugs by a first pivot and a second pivot. The first pivot and the second pivot are respectively disposed slidably in the first slide slot and the second slide slot, thereby enabling the suspension rod to be swiveled between a suspension state and a folding state. The crossbar is fastened to a bottom end of the suspension rod and is used for hanging objects.

1 Claim, 5 Drawing Sheets

SUSPENSION HANGER FRAMEWORK

FIELD OF THE INVENTION

The present invention relates generally to a hanger framework, and more particularly to a suspension hanger framework by means of which objects are hung.

BACKGROUND OF THE INVENTION

As shown in FIG. 1, a suspension hanger framework 05 of the prior art comprises a suspension rod 06, a fixation piece 08 from which the suspension rod 06 is suspended, and a crossbar 09 which is fastened with the suspension rod 06. The fixation piece 08 is provided with a plurality of fastening holes 07 for fastening the fixation piece 08 to a ceiling in conjunction with a plurality of screws. The crossbar 09 is provided with two hanging portions 091 for hanging objects. The suspension rod 06 is fixed with the fixation piece 08 and can not be therefore folded to save the space at such time when the prior art suspension hanger framework 05 is not in use.

BRIEF SUMMARY OF THE INVENTION

The primary objective of the present invention is to provide a suspension hanger framework comprising a fixation piece, a suspension rod, and a crossbar. The fixation piece is fixed with the ceiling or projection of a structure and is provided with two pivoting lugs for fastening pivotally a top end of the suspension rod. The suspension rod can be swiveled in two opposite directions toward the ceiling or projection of the structure. The crossbar is fastened with a bottom end of the suspension rod and is used for hanging objects.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
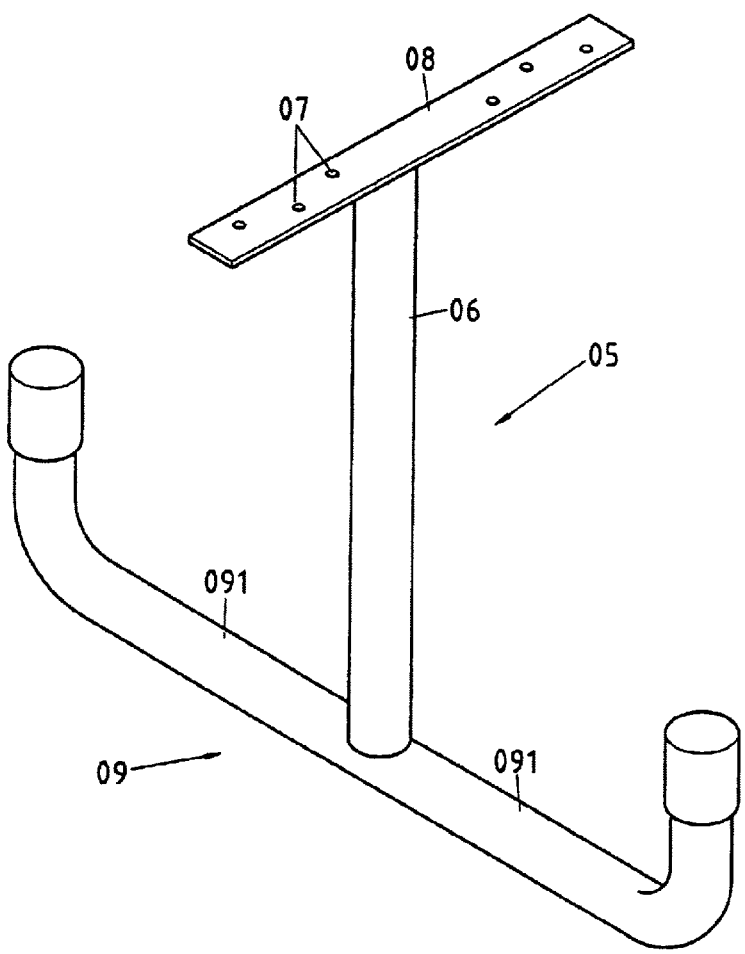
FIG. 1 shows a perspective view of a suspension hanger framework of the prior art.
Figure 2:
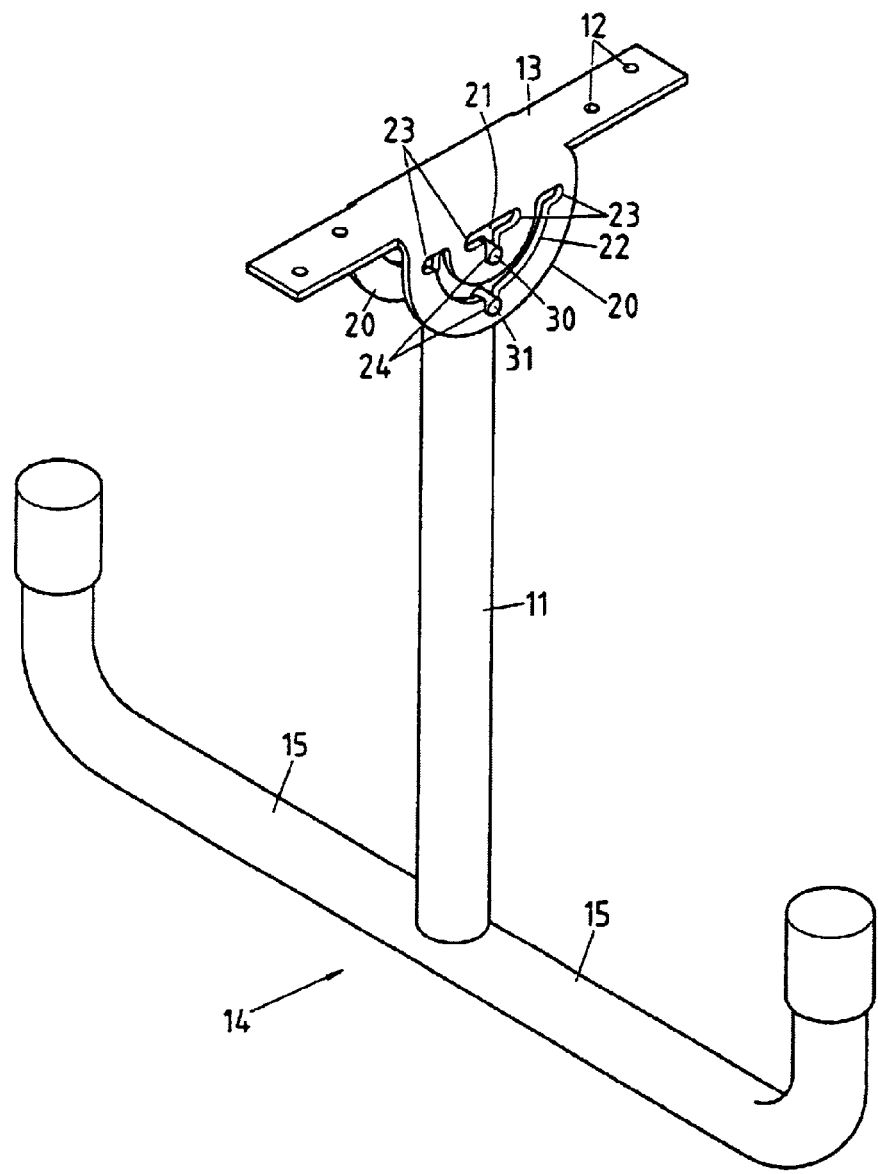
FIG. 2 shows a perspective view of the preferred embodiment of the present invention.
Figure 3:
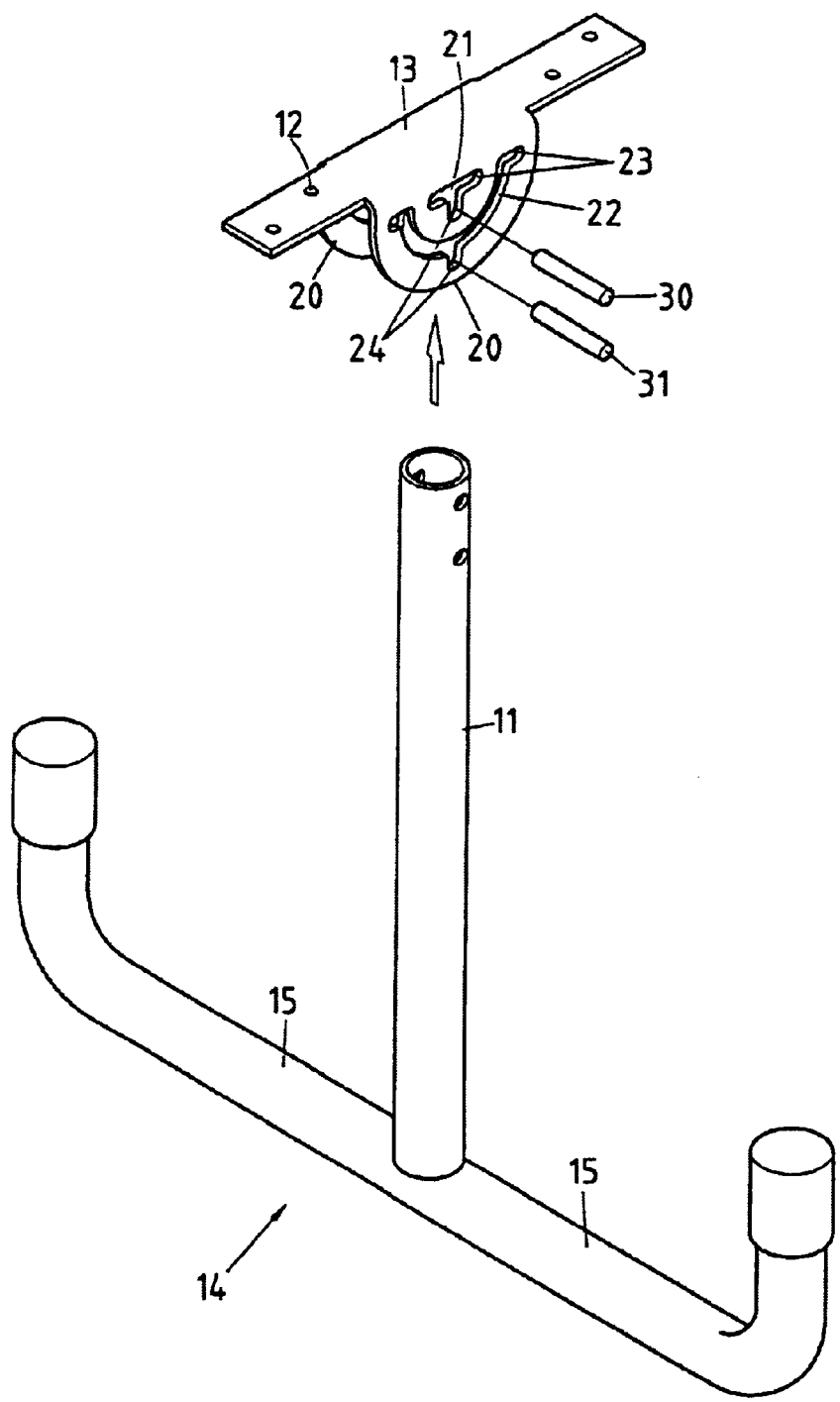
FIG. 3 shows an exploded perspective view of the preferred embodiment of the present invention.

As shown in FIGS. 2 and 3, a suspension hanger framework embodied in the present invention comprises a suspension rod 11, a fixation piece 13, and a crossbar 14. The suspension rod 11 is fastened pivotally at a top end with the fixation piece 13 which is provided with a plurality of fastening holes 12 for fastening firmly the fixation piece 13 with the ceiling or projection of one part of a structure in conjunction with a plurality of fastening screws (not shown in the drawings). The crossbar 14 is fastened with a bottom end of the suspension rod 11 and is provided with two hanging portions 15 for hanging objects.

The suspension hanger framework of the present invention is characterized by the fixation piece 13 which is provided with two pivoting lugs 20 opposite in location to each other and corresponding in construction to each other. The pivoting lugs 20 are provided with a first slide slot 21 and a second slide slot 22. The first slide slot 21 has a shape corresponding to the English letter "T", while the second slide slot 22 has a semicircular shape. Both the first slide slot 21 and the second slide slot 22 are provided with two retaining portions 23 opposite in location to each other, and a locating portion 24 which is disposed midway between the two retaining portions 23.

The top end of the suspension rod 11 is fastened pivotally between the two pivoting lugs 20 of the fixation piece 13 by a first pivot 30 and a second pivot 31. The first pivot 30 is slidably received in the first slide slot 21 of the two pivoting lugs 20, while the second pivot 31 is slidably received in the second slide slots 22 of the two pivoting lugs 20.

Figure 4:
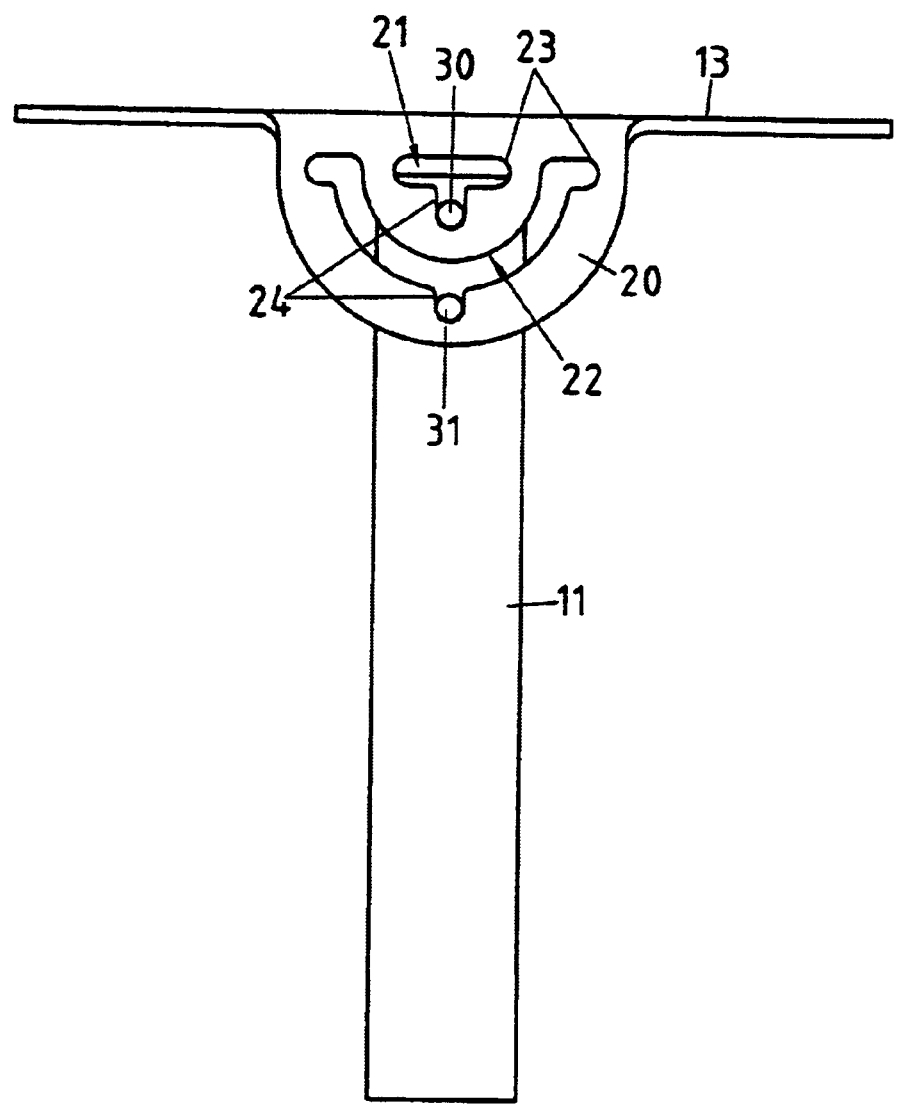
FIG. 4 shows a schematic view of the preferred embodiment of the present invention in the suspension state.

As shown in FIG. 4, when the present invention is in the suspension state, the first pivot 30 is retained in the locating portion 24 of the first slide slot 21 of the two pivoting lugs 20. In the meantime, the second pivot 31 is retained in the locating portion 24 of the second slide slot 22 of the two pivoting lugs 20.

Figure 5:
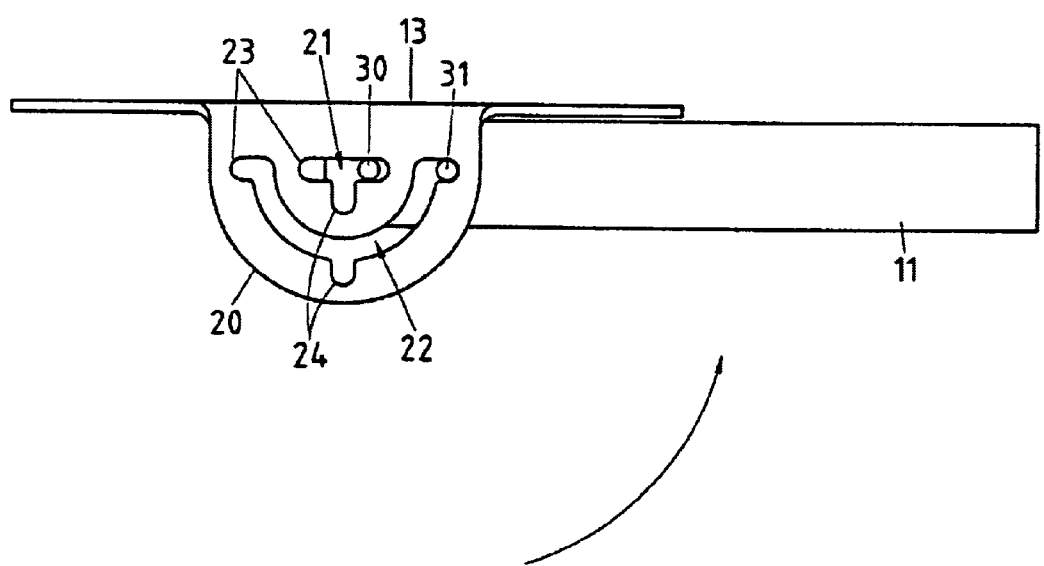
FIG. 5 shows a schematic view of the preferred embodiment of the present invention in the folding state.

As shown in FIG. 5, the suspension rod 11 is swiveled in one of two directions toward the ceiling or projection of the structure to which the fixation piece 13 is firmly fastened, thereby enabling the present invention to be kept in the folding state in which the first pivot 30 is retained in one of the two retaining portions 23 of the first slide slots 21 of the two pivoting lugs 20. In the meantime, the second pivot 31 is retained in one of the two retaining portions 23 of the second slide slots 22 of the two pivoting lugs 20 of the fixation piece 13.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A suspension hanger framework comprising:
   a fixation piece fastened firmly to a ceiling or projection of one part of a structure;
   a suspension rod fastened pivotally at a top end to said fixation piece such that said suspension rod can be swiveled toward the ceiling or projection of the structure; and
   a crossbar fastened to a bottom end of said suspension rod and used for hanging objects;
   wherein said fixation piece is comprised of two pivoting lugs opposite in location to each other and corresponding in construction to each other, said two pivoting lugs being comprised of a first slide slot of a profile corresponding to the English letter "T", and a second slide slot of a semicircular shape, said first slide slot and said second slide slot being comprised of two retaining portions opposite in location to each other, and a locating portion disposed midway between said two retaining portions whereby said two pivoting lugs are used to pivot therebetween the top end of said suspension rod in conjunction with a first pivot and a second pivot, with said first pivot being slidably received in said first slide slots of said two pivoting lugs, and with said second pivot being slidably received in said second slide slots of said two pivoting lugs, said first pivot and said second pivot being retained respectively in said locating portion of said first slide slot and said locating portion of said second slide slot at the time when said suspension rod is kept in a suspension state, said first pivot and said second pivot being retained respectively in one of said two retaining portions of said first slide slot and in one of said two retaining portions of said second slide slot at a time when said suspension rod is swiveled in one of two directions toward the ceiling or projection of the structure, so as to remain in a folding state.

* * * * *